Patented Dec. 19, 1939

2,183,574

UNITED STATES PATENT OFFICE 2,183,574

PREPARATION OF UNSATURATED CYCLIC COMPOUNDS

Arthur A. Levine and Oliver W. Cass, Niagara Falls, N. Y., assignors to E. I. du Pont de Nemours & Company, Wilmington, Del., a corporation of Delaware No Drawing. Application March 27, 1936, Serial No. 71,318

2 Claims. (Cl. 260—666)

This invention relates to the preparation of unsaturated cyclic compounds by the removal of hydrogen chloride from chlorinated saturated cyclic compounds. More particularly, this invention relates to the preparation of cyclohexene by the removal of hydrogen chloride from monochlorcyclohexane.

When cyclohexane is chlorinated until about 40% or less of the theoretical amount of chlorine necessary to form the monochloride has been introduced, the product consists essentially of a mixture of monochlorcyclohexane and unreacted cyclohexane. Dichlorcyclohexane and higher chlorinated products are susbtantially completely absent. Cyclohexane is conveniently chlorinated with gaseous chlorine in the presence of direct sunlight and without a catalyst, and the process with which this invention is concerned may use as the starting material the product of this chlorination comprising monochlorcyclohexane and unreacted cyclohexane. We have found that it is unnecessary to separate the monochlorcyclohexane from the cyclohexane and that we can prepare the desired unsaturated cyclic compound, cyclohexene, by the removal of hydrogen chloride from the chlorcyclohexane while the latter is dissolved in the cyclohexane diluent.

Accordingly it is one of the objects of this invention to prepare cyclohexene by the dehydrogenchlorination of monochlorcyclohexane when the latter compound is dissolved in cyclohexane as a solvent. It is another of the objects of this invention to subject a solution of monochlorcyclohexane in cyclohexane to conditions under which hydrogen chloride is removed, only the monochloride being attacked, thereby obtaining a final product comprising cyclohexene dissolved in the unchanged cyclohexane as the solvent. It is still another object of this invention to prepare valuable products from monochlorcyclohexane (resulting from the chlorination of cyclohexane) without the necessity of separating that monochloride from the unreacted cyclohexane in which it is dissolved. These and still further objects of our invention will be apparent from the ensuing disclosure which constitutes a preferred embodiment of our process.

The starting material which is employed in our improved method comprises essentially a mixture of monochlorcyclohexane and cyclohexane. This may be prepared in various ways, for example by admixing the two constituents, but in practice it is the reaction product obtained by the direct chlorination of cyclohexane under conditions whereby the formation of substantial amounts of di- and higher chlorides are avoided.

For chlorinating cyclohexane in order to obtain our starting material, a solution of monochlorcyclohexane in cyclohexane, we preferably use gaseous chlorine and carry out the substitution in the presence of direct sunlight. Chlorine is passed in until approximately 40% or less of that theoretical quantity of hydrogen chloride, which would have been evolved if complete chlorination of the cyclohexane to the monochloride stage had taken place, has passed off from the reaction vessel. Under these conditions the product consists of about 40% monochlorcyclohexane and about 60% of unreacted cyclohexane, dichlorcyclohexane and higher chlorinated products not being present in any appreciable amount.

The mixture of unreacted cyclohexane and monochlorcyclohexane is then allowed to drop slowly into a reaction vessel in which there is positioned a suitable dehydrogenchlorination catalyst. Barium chloride, on a charcoal carrier, prepared by impregnating the charcoal with a solution of barium chloride, may be used and will give very satisfactory yields. We have also found charcoal itself an effective catalyst and it may be employed in the cracking step, as may aluminum oxide or any other well known catalyst for the removal of hydrogen chloride from saturated materials in a vapor phase reaction. In the appended claims we have grouped these catalysts collectively under the term dehydrogenchlorination catalysts.

We have found that a temperature somewhat higher than that ordinarily necessary when pure monochlorcyclohexane is cracked in a vapor phase reaction is essential in order that relatively high yields may be obtained. Accordingly we prefer to employ a temperature within the temperature range 400 to 500° C. This is somewhat higher than the temperature ordinarily used for removing hydrogen chloride from pure chlorcyclohexane, which temperature is ordinarily in the neighborhood of 325° C.

After bringing the mixture of cyclohexane and monochlorcyclohexane into contact with the dehydrogenchlorination catalyst, the effluent gases may be cooled and the evolved hydrogen chloride removed therefrom in any convenient way as by scrubbing with water. The residue is a liquid product which consists of cyclohexane and cyclohexene. It is substantially free from unreacted monochlorcyclohexane.

We have obtained high yields by the use of the method described above, in practice the yields being as high as 95% conversion of the monochlorcyclohexane into cyclohexene. The product consists of cyclohexene dissolved in the solvent cyclohexane, which has not been chemically changed during the cracking process, and it is significant that unreacted chlorcyclohexane is not present to any substantial amount in the product.

As an example of our novel process for the conversion of mixtures of monochlorcyclohexane and cyclohexane into mixtures of cyclohexene and cyclohexane, the following may be given:

Example 252 grams (3 moles of cyclohexane was chlorinated in a small flask by the passage of chlorine gas into the cyclohexane. No catalyst was used but the process was carried out in direct sunlight. After there had been evolved 30.5 grams (0.835 mole) of hydrogen chloride the chlorination was stopped and the product removed from the flask. The chlorine addition corresponded to 28% of the theoretical amount required for the complete chlorination of cyclohexane to the monochloride stage and the product contained, therefore, approximately 28% of monochlorcyclohexane.

The mixture resulting from the chlorination just described was then allowed to drop slowly into a quartz tube packed with charcoal which had previously been impregnated with barium chloride. The temperature was maintained within the range 400 to 450° C. The effluent gases were cooled, the hydrogen chloride contained therein scrubbed out with water, and the condensed liquid product separated therefrom.

The hydrogen chloride evolved was determined by titration of the aqueous layer and was found to be about 29 grams (0.798 mole). This corresponds to a cracking of 95% of the monochloride present. Upon distillation of the product all but 3.0 grams passed over at 80 to 82° C., showing that practically complete decomposition of the monochloride had taken place. The product was a mixture of cyclohexene boiling at 80–82° C. and cyclohexane. The latter had not been changed chemically during the cracking.

It is to be understood that the various procedures and amounts herein described as illustrative are not to be regarded as limiting the invention. Various changes might be made in the described mode of operation which would still fall within the scope of our invention.

In its broadest aspect, our invention comprises the conversion of monochlorcyclohexane, which is suspended or dissolved in a solvent such as cyclohexane, to cyclohexene by the use of a dehydrogenchlorination catalyst, the cyclohexane remaining unchanged during the process. The scope of our invention is, therefore, to be determined not by including details intended merely as illustrative but in accordance with the appended claims.

We claim:

1. A process which comprises reacting cyclohexane with an amount of chlorine only sufficient to convert a minor proportion of the cyclohexane to monochlorocyclohexane and passing the resultant mixture of cyclohexane and monochlorocyclohexane over a dehydrogenchlorination catalyst at a temperature of 400–500° C.

2. A process which comprises reacting cyclohexane with an amount of chlorine only sufficient to convert not substantially more than 40% of the cyclohexane to monochlorocyclohexane and passing the resultant mixture of cyclohexane and monochlorocyclohexane over a dehydrogenchlorination catalyst at a temperature of 400–500° C.

ARTHUR A. LEVINE.
OLIVER W. CASS.